Nov. 20, 1956 T. G. HARE 2,771,231
CAR TOP LUGGAGE CARRIER STRUCTURE
Filed Nov. 10, 1954 2 Sheets-Sheet 1

INVENTOR.
TERENCE G. HARE
BY
Barnes, Kisselle, Laughlin & Raisch
ATTORNEYS.

Nov. 20, 1956 T. G. HARE 2,771,231
CAR TOP LUGGAGE CARRIER STRUCTURE
Filed Nov. 10, 1954 2 Sheets-Sheet 2
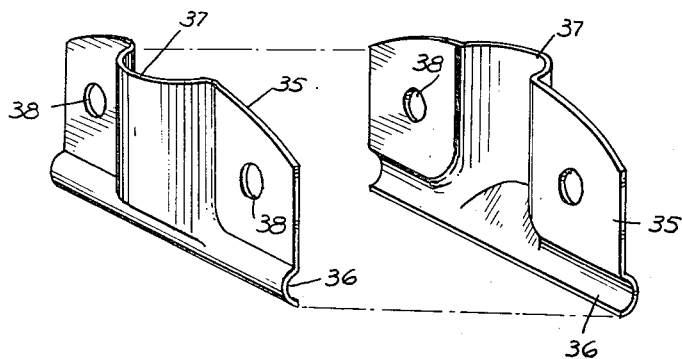
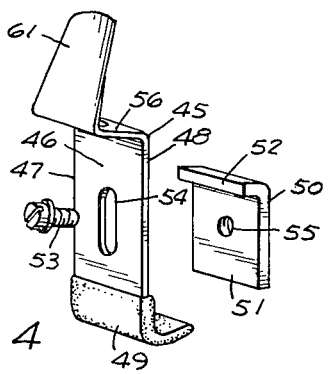
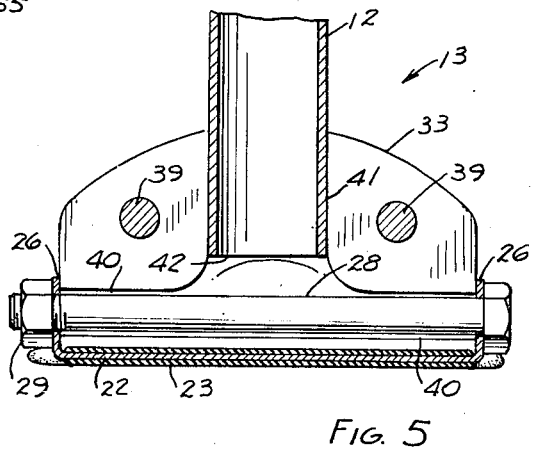
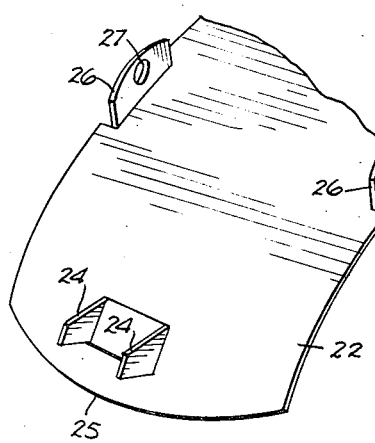
INVENTOR.
TERENCE G. HARE
BY
Barnes, Kisselle, Laughlin & Raisch
ATTORNEYS.

United States Patent Office 2,771,231
Patented Nov. 20, 1956

2,771,231

CAR TOP LUGGAGE CARRIER STRUCTURE

Terence G. Hare, Detroit, Mich., assignor to Miller Manufacturing Co., Detroit, Mich., a corporation of Michigan Application November 10, 1954, Serial No. 467,952

5 Claims. (Cl. 224—42.1)

This invention relates to a luggage carrier of the type secured on the top of an automobile.

One type of carrier comprises a rack supported above the automobile top by legs with shoes on the ends of the legs anchored against the top by clamps hooked on the drip troughs above the automobile windows.

An object of this invention is to provide an improved, simplified, inexpensive shoe structure for supporting the luggage rack legs. The invention generally utilizes a single plate bendable to conform to the shape of the automobile top with two identical stampings pivoted thereon and forming a socket rotatably receiving a luggage rack leg. One form of the invention is shown in the accompanying drawings:

Fig. 3 is an exploded perspective view of the socket plates separate from the rest of the structure.

Fig. 4 is an exploded perspective view of a clamp for engaging a drip trough.

Fig. 5 is an enlarged sectional view on line 5—5 of Fig. 2 illustrating the relation between the socket member and shoe plate.

Fig. 6 is a fragmentary elevational view showing the structure of the shoe plate.

Figure 1:
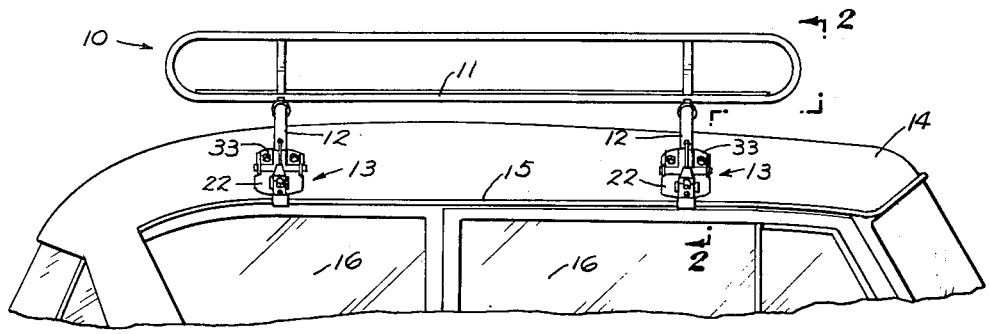
Fig. 1 is an elevational view of a luggage rack according to this invention secured on an automobile top.

Shown in the drawings is a luggage carrier 10 having a rack portion 11 for supporting luggage and having generally downwardly extending cylindrical legs 12 with shoes 13 secured against the top 14 of an automobile by a clamp hooked around a drip trough 15 above the automobile windows 16. The luggage rack includes transverse members 20 connected to legs 12 and having telescoped construction for length adjustment according to the width of car top 14. The telescoping members are secured into adjusted position by a bolted clamp construction 21.

Figure 2:
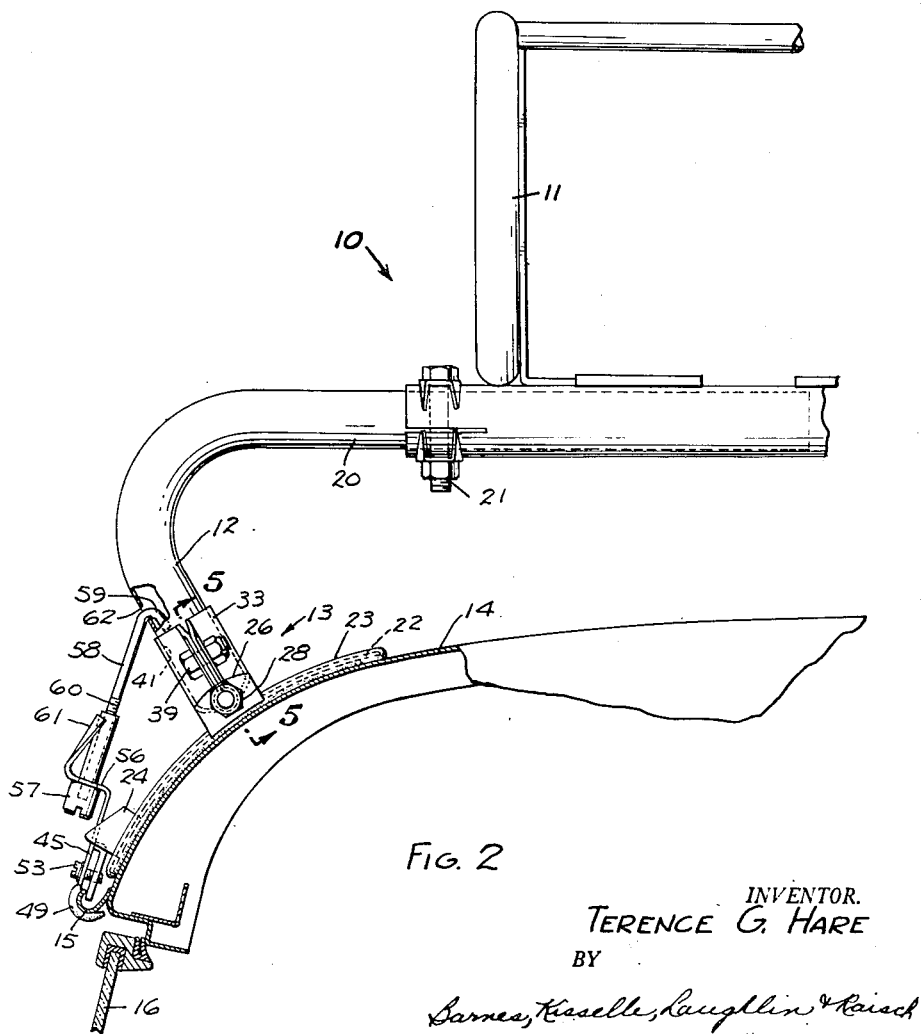
Fig. 2 is an enlarged sectional view on line 2—2 of Fig. 1.

Each shoe 13 has a plate 22 preferably formed of metal and having form retaining characteristics but being bendable to conform to the shape of automobile top 14. Plate 22 has a coating 23 of a cushioning material such as a natural or synthetic rubber or a thermoplastic material as shown in Fig. 2. The plate is shown in Fig. 6 in uncoated condition. Plate 22 has struck up ears 24 generally adjacent its lower edge 25 and has struck up opposite edge portions 26 apertured as at 27 to form mounts for a shaft or pintle 28 preferably comprising a bolt (Fig. 5) secured in position by a nut 29. Shaft 28 extends generally parallel to the adjacent surface of plate 22.

A socket member 33 pivoted on shaft 28 comprises two preferably identical stampings 35 (Fig. 3), each having an elongate bearing depression 36 and a socket depression 37, the axes of the socket and bearing depressions extending perpendicularly to each other. Socket plates 35 preferably have openings 38 therein and are secured into interfacial engagement by bolts 39 extending therethrough with the respective depressions in the plates apposed to each other to form a bearing 40 rotatably engaging around shaft 28 and to form a generally cylindrical socket 41 for rotatably receiving and supporting the lower end 42 of a leg 12 on rack 11.

A clamp for securing the rack structure and shoe 13 to car top 14 comprises an element 45 with a body portion 46 having side edges 47 and 48 and a lower end portion 49 forming a hook for engaging around drip trough 15, the hook preferably being coated with a cushioning material such as a natural or synthetic rubber or a thermoplastic material. The other clamp element 50 has a lower inner face portion 51 for engaging an inner edge of the drip trough (Fig. 2) and has a lateral projection 52 for engagement against body portion 46 of clamp element 45.

A headed screw 53 extends through a slotted opening 54 in body 46 and threads into an opening 55 in clamp member 50 for adjustably securing the clamp members together. Member 45 has an apertured shoulder portion 56 through which a headed screw 57 projects and a rod 58 having a hooked end portion 59 is threaded onto screw 57 as at 60. The upper end portion 61 of member 45 is formed inwardly to engage and provide lateral support for screw 57. Hook portion 59 is arranged for hooking into an opening 62 in leg 12 above socket element 33.

In use, the luggage carrier is positioned on car top 14 with the length of telescoping transverse members 20 adjusted so that shoe plates 22 rest on the side regions of the car top in positions spaced somewhat from drip troughs 15 (Figs. 1 and 2). Elements 20 are secured in adjusted position by tightening bolt means 21. Plates 22 rotate on shaft 28 to adjust to the lateral slope of the car top. The pin and socket joint provided by interengaging legs 12 and sockets 41 has an axis extending transversely of the car top surface, thereby facilitating rotation of shoes 13 to an attitude conforming to the longitudinal curvature of the car top. Plates 22 may be bent to fit the local contour of the car top.

The shoes and luggage carrier are secured into position by engaging hooks 49 around drip troughs 15, engaging hooks 59 within openings 62 in legs 12 and tightening screw 57 to bring plates 22 into firm engagement against car top 14. Inner faces 51 of clamp members 50 are clamped against inner edges of the drip troughs by tightening screws 53 to prevent hooks 49 from disengaging the troughs. Edges 47 and 48 of clamp member 45 are engaged by ears 24 to provide lateral support for the clamping structure.

The two rotational adjustment features of plates 22 and the bendable nature thereof provides for a nice interengagement of the shoes with the car top and legs 12. The shoes are spaced from the drip troughs so that none of the weight on the shoes bears on the drip troughs. Shafts 28 and socket plates 35 extend generally longitudinally of the car, providing improved structure strength for supporting the thrust of the luggage rack and luggage thereon during acceleration and braking. The use of a unitary shoe plate 22 and identical socket plates 35 provides a simplified inexpensive shoe structure.

I claim:

1. A structure for mounting a luggage carrier having a downwardly extending supporting leg, on the top portion of an automobile body comprising, a plate adapted to rest upon the top portion of the automobile body, two projections extending upwardly from the plate and spaced from each other in a fore and aft direction with reference to the automobile, a pair of matching connector plates, the lower edge of each connector plate having a first concavity extending generally horizontally and constituting substantially one-half of a bearing, the central part of each plate having an upwardly extending concavity constituting substantially one-half of a socket, said connector plates being disposed in interfacial relationship with the matching first concavities constituting a bearing, the lower edges of the connector plates positioned between the projections on said plate, a pintle member passing through said projections and said bearing, the matching upwardly extending concavities constituting a socket, the downwardly extending supporting leg being disposed in the socket, means for securing the two connector plates together, and tightening means interposed between the downwardly extending supporting leg and a portion of the automobile body for holding said plate against the top of the automobile body.

2. A structure for mounting a luggage carrier having a downwardly extending supporting leg, on the top portion of an automobile body comprising, a plate adapted to rest upon the top portion of the automobile body, two projections extending upwardly from the plate and spaced from each other in a fore and aft direction with reference to the automobile, a pair of matching connector plates, each connector plate having a first concavity extending generally horizontally and constituting substantially one-half of a bearing, each connector plate having an upwardly extending concavity opening through its upper edge and constituting substantially one-half of a socket, said connector plates being disposed at interfacial relationship with the matching first concavities constituting a bearing, the connector plates being disposed between the projections on said plate with the bearing in alignment therewith, a pintle member passing through said projections and said bearing for pivotally connecting said plate to the connector plates, the matching upwardly extending concavities constituting an upwardly opening socket, the downwardly extending supporting leg being disposed in the socket, means for securing the connector plates together, and tightening means interposed between the downwardly extending supporting leg and a portion of the automobile body for holding said plate against the top of the automobile body.

3. A structure for mounting a luggage carrier having a downwardly extending supporting leg, on the top portion of an automobile body comprising, a plate adapted to rest upon the top portion of the automobile body, two projections extending upwardly from the plate and spaced from each other in a fore and aft direction with reference to the automobile, a pair of matching connector plates, each connector plate having an elongated concavity extending generally horizontally and constituting substantially one-half of a bearing, each connector plate having an upwardly extending concavity opening through its upper edge and constituting substantially one-half of a socket, said connector plates being disposed in interfacial relationship with the matching first concavities constituting an elongated bearing positioned between and in axial alignment with the said two projections on said plate, a pintle member passing through said projections and said bearing for pivotally connecting the plate to said two connector plates, the matching upwardly extending concavities constituting a socket, the downwardly extending supporting leg being disposed in the socket, means for securing the connector plates together, and tightening means interposed between the downwardly extending supporting leg and a portion of the automobile body for holding said plate against the top of the automobile body.

4. A structure for mounting a luggage carrier having a downwardly extending supporting leg, on the top portion of an automobile body comprising, a plate adapted to rest upon the top portion of the automobile body, two projections extending upwardly from the plate and spaced from each other in a fore and aft direction with reference to the automobile, a pair of matching connector plates, each connector plate having an elongated concavity extending generally horizontally and constituting substantially one-half of a bearing, each connector plate having an upwardly extending concavity opening through its upper edge and constituting substantially one-half of a socket, said connector plates being disposed in interfacial relationship with the matching first concavities constituting an elongated bearing positioned between and in axial alignment with the said two projections on said plate, a pintle member passing through said projections and said bearing for pivotally connecting the plate to said two connector plates, the matching upwardly extending concavities constituting a socket, the downwardly extending supporting leg being disposed in the socket, bolts connecting the two connector plates together and constricting the socket about the supporting leg, and tightening means interposed between the downwardly extending supporting leg and a portion of the automobile body for holding said plate against the top of the automobile body.

5. A structure for mounting a luggage carrier having a downwardly extending supporting leg, on the top portion of an automobile body comprising, a plate adapted to rest upon the top portion of the automobile body, an upturned projection adjacent the forward and rearward edge of the plate, said projections each having an aperture therein, a pair of matching connector plates, the lower edge of each connector plate having a first concavity extending generally horizontally and opening through opposite edges thereof and constituting substantially one-half of a bearing, the central part of each plate having an upwardly extending concavity opening through its upper edge and constituting substantially one-half of a socket, the plates having plane surfaces, said connector plates being disposed together with the plane surfaces in interfacial relationship and with the first concavities constituting an elongated bearing, said connector plates being disposed so that the elongated bearing extends substantially from one said projection to the other, a bolt passing through the apertures in the projections and through said bearing for pivotally connecting the connector plates to said plate, the matching upwardly extending concavities constituting a socket which opens upwardly, the downwardly extending supporting leg being disposed in said socket, bolts securing the connector plates together, and tightening means interposed between the downwardly extending supporting leg and a portion of the automobile body for holding said plate against the top of the automobile body.

References Cited in the file of this patent
UNITED STATES PATENTS

| | | |
|---|---|---|
| 2,643,040 | Hare | June 23, 1953 |
| 2,663,472 | Belgau | Dec. 22, 1953 |
| 2,683,265 | Wayne | July 13, 1954 |